United States Patent [19]

Williams et al.

[11] 4,113,044
[45] Sep. 12, 1978

[54] ARTICULATED STEERING DIFFERENTIAL LOCK RELEASE

[75] Inventors: Douglas W. Williams, Waukesha; George E. Kaiser, West Allis, both of Wis.

[73] Assignee: Allis-Chalmers Corporation, Milwaukee, Wis.

[21] Appl. No.: 750,918

[22] Filed: Dec. 15, 1976

[51] Int. Cl.² .............................................. B60K 17/34
[52] U.S. Cl. ...................................... 180/51; 74/710.5
[58] Field of Search ....................... 180/49, 51, 52, 59; 74/710.5

[56] References Cited

U.S. PATENT DOCUMENTS

| 3,865,208 | 2/1975 | Crawshay et al. | 180/51 X |
|---|---|---|---|
| 3,939,936 | 2/1976 | Vinton | 180/51 X |

Primary Examiner—Joseph F. Peters, Jr.
Assistant Examiner—Michael Mar
Attorney, Agent, or Firm—Arthur L. Nelson

[57] ABSTRACT

A differential lock release on a four-wheel drive articulating vehicle having a cam operated mechanism to operate the differential clutch when the vehicle is articulated.

10 Claims, 6 Drawing Figures

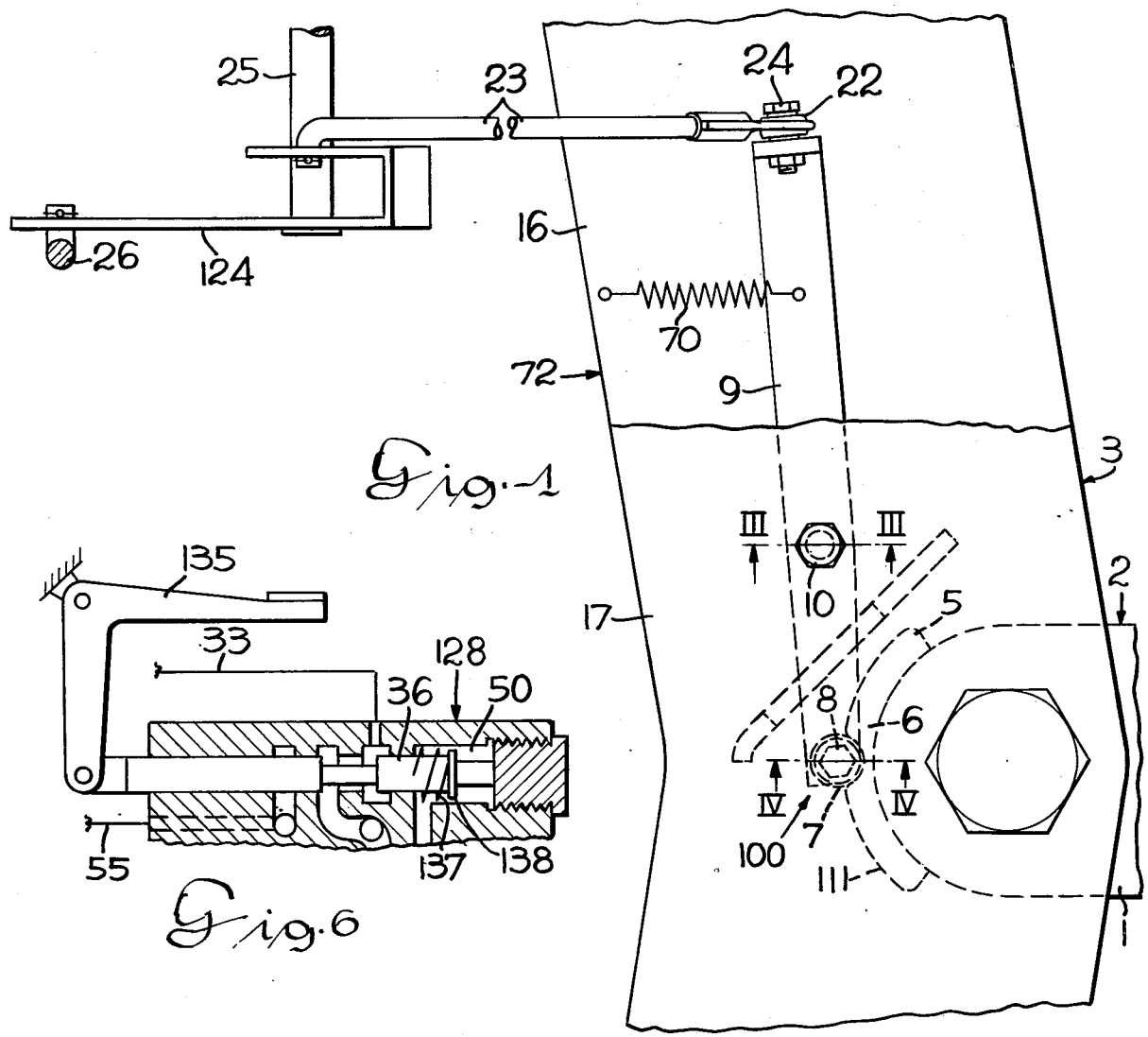
Fig. 1
Fig. 6
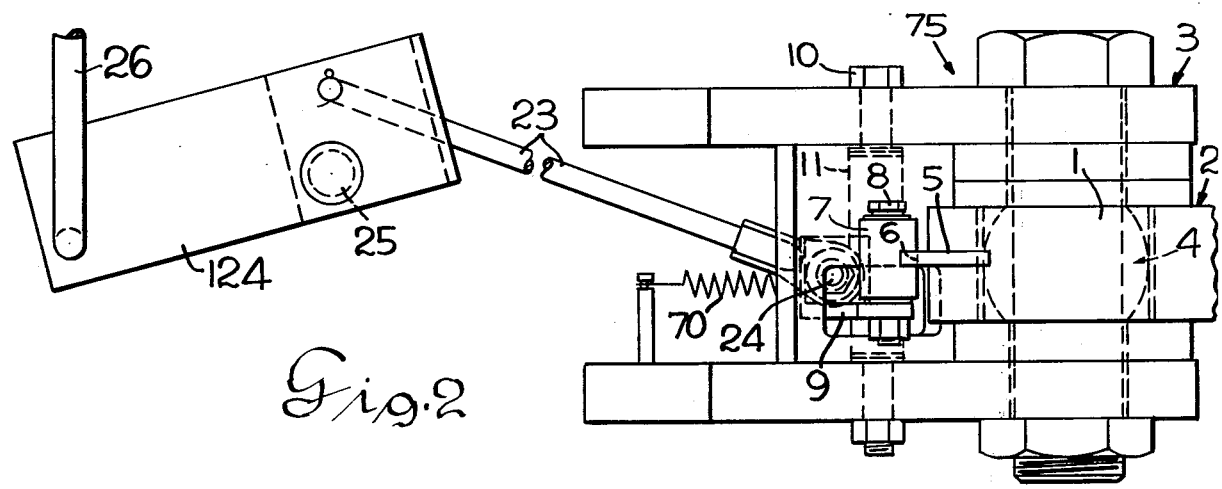
Fig. 2

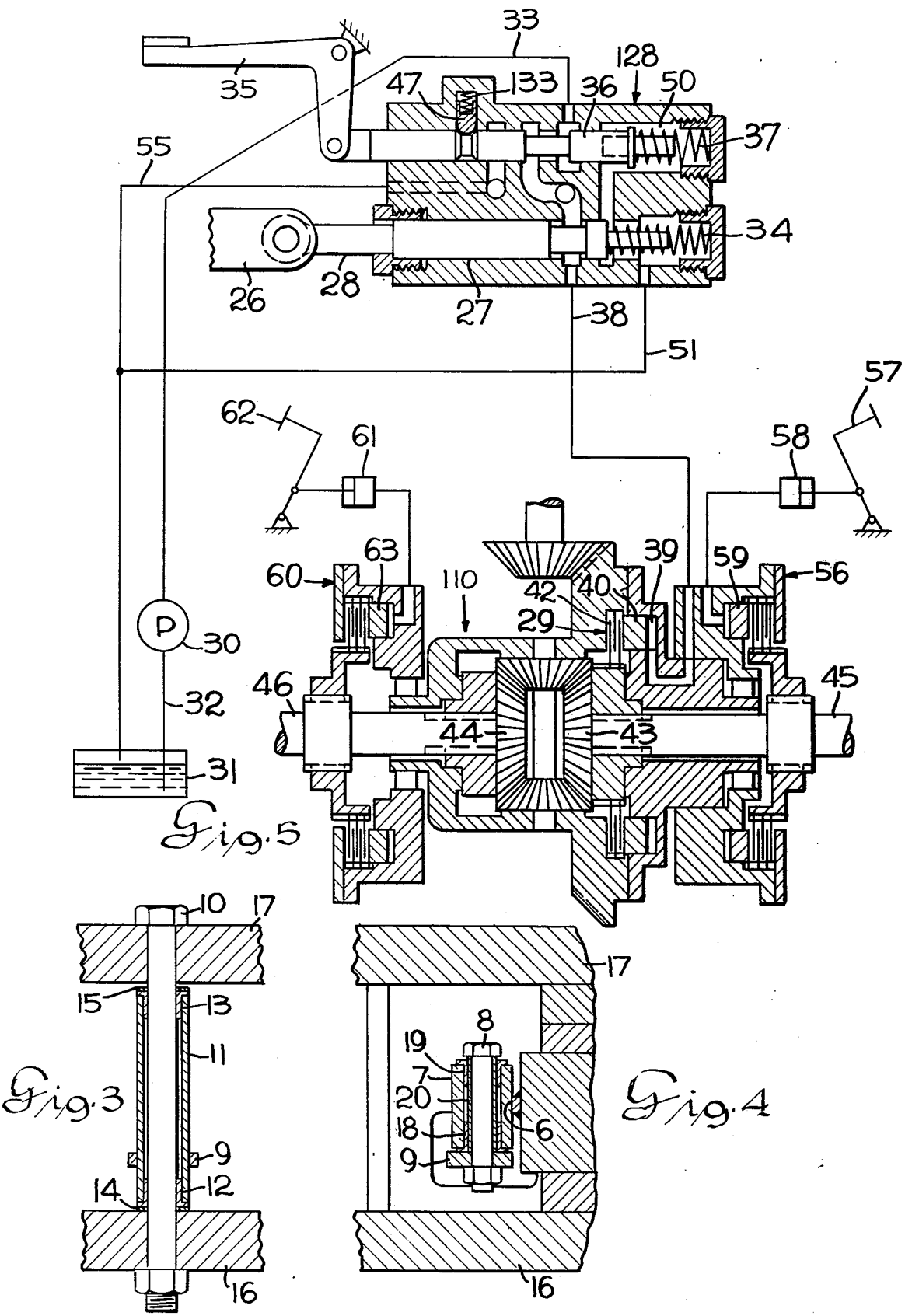

ARTICULATED STEERING DIFFERENTIAL LOCK RELEASE

This invention relates to a differential lock and more particularly to a differential lock control on a four-wheel drive articulated vehicle having a cam operated mechanism to release the differential clutch when the vehicle is articulated at least 5°.

Conventional two-wheel tractors employ a differential lock to improve the traction of the tractor under heavy load conditions. The differential lock assures that if one wheel has better traction than the other, the traction will be transferred to this wheel and prevent the other wheel from slipping and thereby causing loss of power. Differential locks operate satisfactorily so long as the vehicle is traveling straight ahead. When the vehicle is being steered, however, differential action is necessary on the rear wheels to allow for the differential in speed of the wheels as the vehicle turns. The conventional release of the differential lock on a two-wheel drive tractor may be in response to actuation of one or other brakes because usually one of the rear wheels is braked when the vehicle is steered. Accordingly, when one or the other or both of the rear wheels are braked, the differential clutch is released and differential action between the two rear axles is again permitted.

This type of differential release is not practical on a four-wheel drive tractor since the tractor may be steered without brake actuation. The differential for a four-wheel drive articulating vehicle may be locked by use of a pedal which is depressed by the operator and the differential released when the pedal is released to thereby provide differential action as desired by the operator. This, however, is an additional burden on the operator who may be attentive to other things rather than being concerned with the differential on the tractor and he may forget to operate the differential or release the differential clutch when it is desirable. Accordingly, this invention provides for a mechanical pedal operated means for operating the differential lock of a four-wheel drive tractor. The rear wheels are preferably controlled by a differential and can be locked by merely operating the pedal. A cam on the rear bogie operates the follower on the front bogie which in turn is connected through a mechanism to operate the control valve for the differential lock and release. In this manner, the cam follower operating the mechanism in turn releases the pressure of hydraulic fluid in the hydraulic actuator of the differential clutch when the vehicle articulates 5° or more. The differential release is automatic in response to steering.

It is an object of this invention to provide a differential lock for an articulating vehicle.

It is a further object of this invention to provide a mechanical differential lock release and a mechanical differential lock on a articulated vehicle.

It is a further object of this invention to provide a cam operated differential lock release on an articulating vehicle. The cam is mounted on one of the bogies while the cam follower is mounted on the other bogie and when a differential angle caused by articulation of the vehicle reaches 5°, the follower operates a linkage which automatically releases the differential lock.

The objects of this invention are accomplished by providing a cam on a segment of the articulating bearing connected to the rear bogie. A follower mounted on the front bogie engages a cam slot when the vehicle is traveling straight ahead thereby allowing the linkage to be inactivated. When the vehicle is articulated 5° or more, the cam follower rises out of the cam slot causing a movement of the linkage to release the differential lock and allow differential action between the rear wheels. Preferably, the linkage operates a differential lock control valve through a spool which interrupts the flow of pressurized fluid from the pump to the hydraulic actuator in the differential clutch. The fluid is vented to sump and the differential clutch is released. When the vehicle again is traveling straight ahead, the cam follower drops into the cam slot and the differential can again be locked. The differential can be locked, however, only by manual operation by the operator of the vehicle. Automatic operation of the differential lock and release responsive to articulation is provided in a modification.

Referring to the drawings, the preferred embodiments of this invention are illustrated.

FIG. 1 illustrates a plan view of the cam operated linkage on the articulating joint of an articulating vehicle;

FIG. 2 is a side elevation view of the cam operated mechanism on the articulating joint of the vehicle;

FIG. 3 is a cross section view taken on line III—III of FIG. 1;

FIG. 4 is a cross section view taken on line IV—IV of FIG. 1;

FIG. 5 is a section view of the differential lock control valve and the differential for the articulating vehicle; and FIG. 6 is a cross-section view of a modification of the control valve.

Referring to the drawings, FIGS. 1 and 2 illustrate views of the articulating bearing. The link 1 of the rear bogie 2 is pivotally connected to the front bogie 3 through a ball and socket bearing 4. Link 1 carries the cam 5 forming a base circle 111 and a cam slot 6 for receiving the roller 7 of follower 100. The roller 7 is rotatably mounted on the bolt 8 which is fastened to the lever 9. The lever 9 is pivotally mounted on the bolt 10. The sleeve 11 is integral with the lever 9 and is carried on the bushings 12 and 13. The washers 14 and 15 are positioned between the bushings 12 and 13 and the lower segment 16 and the upper segment 17 of the front bogie 3.

The cam follower 100 includes the roller 7 which is supported on the bushings 18 and 19 which embrace the sleeve 20 carried on the bolt 8. The bolt 8 is bolted onto the lever 9.

The lever 9 extends transversely on the vehicle to a ball and socket joint 22 which is fastened to the push rod 23 by means of bolt 24. The push rod 23 is pivotally connected to the bellcrank 124 which is pivotally mounted on the shaft 25. The bellcrank 124 is also pivotally connected to the link 26 which in turn is connected to the release spool 27 in the control valve 128 for the differential lock release.

Referring to FIG. 5, link 26 is pivotally connected to the stem 28 of the release spool 27. The release spool 27 operates to release the differential clutch 29.

The hydraulic system includes a pump 30 receiving fluid from the reservoir 31 through the conduit 32. The pump 30 pressurizes fluid in the conduit 33 of the differential valve 128. Normally the release spool 27 is biased to the left-hand position as shown by the spring 34. When the lever 35 is depressed, the control spool 36 is moved in the right-hand direction against the biasing force of the spring 37. Pressurized fluid in conduit 33 then flows through the control valve into the conduit 38 and the pressurizing chamber 39 of the hydraulic actuator 40 of the differential clutch 29. The clutch discs 42 are then compressed to thereby lock the side gears 43 and 44 for synchronous rotation of the wheel axles 45 and 46.

The detent 47 holds the control spool 36 in the right-hand position against the biasing force of spring 37. The fluid pressure in the release chamber 50 is at sump pressure since it is connected through the sump passage 51 to the reservoir 31. When the stem 28 biases the release spool 27 in the right-hand direction, pressurized fluid is allowed to flow into the release chamber 50 thereby biasing the control spool 36 in the left-hand direction and interrupting flow of pressurized fluid from conduit 33 to conduit 38. Further, movement of the control spool 36 allows the pressurized fluid in conduit 38 to vent to sump through passage 55. If automatic operation of the differential lock is desired through the cam operated follower, the spring 37 may be replaced by a spring 137 on spool 36 to normally bias the spool 36 in the right-hand position as shown in FIG. 6. The lever 135 releases the differential lock.

The right wheel brake 56 is operated by the right wheel brake lever 57 by pressurizing fluid in the cylinder 58 and the hydraulic actuator 59 of the right wheel brake. The left wheel brake 60 is actuated by pressurizing fluid in the cylinder 61 by means of the left-hand brake pedal 62. Hydraulic actuator 63 receives pressurized fluid and operates the left wheel brake.

The operation of this device will be described in the following paragraphs.

The lever 9 is normally biased so that the follower 100 is in an engaging position with the cam 5 by means of the spring 70 connected between the chassis 72 of the front bogie 3 and the lever 9. So long as the vehicle is traveling straight ahead, the roller 7 of the cam follower 100 is resting in the cam slot 6. If the operator desires to have the differential locked, the pedal 35 is depressed. The pump 30 is pressurizing fluid in conduit 33 so long as the engine is operating. As the control spool 36 moves in the right-hand direction, communication is provided between the conduit 33 and conduit 38 and pressurized fluid is supplied to the pressurizing chamber 39 of hydraulic actuator 40. The control spool 36 is held in this position by the detent 47 against the biasing force of the spring 37. The rear axles 45 and 46 rotate synchronously when the differential 110 is locked.

When the vehicle is steered, the articulating joint 75 articulates and when the articulation reaches 5°, the follower roller 7 raises from the cam slot 6. This in turn pivots the lever 9 causing the push rod 23 to pivot the bellcrank 124. This in turn causes the link 26 to operate the release spool 27 and move the spool in the right-hand direction allowing pressurized fluid to flow into the release chamber 50. The pressurized fluid in the release chamber 50 biases the control spool 36 in the left-hand direction interrupting flow from the conduit 33 to conduit 38. Fluid in the conduit 38 and the pressurizing chamber 39 is vented to sump through the passage 55 and the clutch 29 releases the differential 110 and permits the differential rotation between the rear axles 45 and 46. As long as the vehicle is turning, this condition exists and the differential permits the side gears 44 and 43 to rotate differentially.

When the vehicle is again steered straight ahead, the differential will still operate differentially. Locking of the differential requires that the operator press the pedal 35 downwardly forcing the spool 36 in the right-hand position as shown in FIG. 5 which in turn places communication between the conduit 33 and conduit 38 to pressurize fluid in the chamber 39 to operate the clutch 29. This again causes the side gears to rotate synchronously.

Automatic operation of the differential lock responsive to articulation can be provided by replacing spring 37 on the right-hand side at shoulder 138 by a spring 137 on the left-hand side of shoulder 138. The position of spool 27 controls the operation of the differential lock.

The embodiments of the invention in which an exclusive property or privilege is claimed are defined as follows:

1. A differential lock release for an articulating vehicle comprising, an articulating joint including a bearing pivotally connecting one bogie to another bogie of the articulated vehicle, a cam mounted on one of the bogies, a follower mounted on the other bogie of the articulated vehicle, a differential lock control mechanism connected to the follower, control means operating a differential lock, a differential on a vehicle including differential locking means defining a differential clutch for releasing and locking said differential and providing differential and synchronous rotation of said gears, a wheel axle connected to one side gear and another wheel axle connected to another side gear, said control means connecting said differential lock control mechanism to said differential to operate said differential for differential and synchronous rotation of said axles responsive to articulation of said vehicle.

2. A differential lock release for an articulating vehicle as set forth in claim 1 wherein said differential lock control mechanism includes a lever pivotally mounted on said other bogie of said vehicle, means connecting the cam follower to one end of said lever, a linkage connected to the other end of said lever for operation of said control means for releasing said differential.

3. A differential lock release for an articulating vehicle as set forth in claim 1 wherein said control means includes a hydraulic valve, said differnetial locking means includes a hydraulic differential clutch operated through said valve for controlling said differential.

4. A differential lock release for an articulating vehicle as set forth in claim 1 wherein said control means includes a hydraulic valve, a spool in said hydraulic valve operated by said differential lock control mechanism.

5. A differential lock release for an articulating vehicle as set forth in claim 1 wherein said differential lock control mechanism includes a lever pivotally mounted on said other bogie carrying said follower, a push rod operated by said lever, a bellcrank pivotally connected to said push rod and pivotally connected to said control means for controlling said differential locking means when said vehicle is articulated.

6. A differential lock release for an articulating vehicle as set forth in claim 1 wherein said control means includes a hydraulic valve including, a mechanically operated valve spool for controlling flow of pressurized fluid to said locking means in said differential, a release spool in said hydraulic valve for releasing pressurized fluid in said differential locking means for releasing said differential for differential rotation of said axles.

7. A differential lock release for an articulating vehicle as set forth in claim 1 wherein said one bogie defines the rear bogie of said articulating vehicle, said other bogie defines the front bogie of said articulating vehicle.

8. A differential lock release for an articulating vehicle as set forth in claim 1 wherein said control means operates said differential clutch for releasing and locking said differential.

9. A differential lock release for an articulating vehicle as set forth in claim 1 wherein said differential locking means includes manual means for manually operating said differential locking means.

10. A differential lock release for an articulating vehicle as set forth in claim 1 including means defining a vertical pivoting axis of said articulating joint, said cam follower including a roller defining a vertical rotating axis, said cam defining a cam slot for receiving said roller in the rest position, a lever supporting said roller on said vertical axis, means defining a vertical pivoting axis for said lever on said other bogie to pivot in response to articulation of said articulating joint.

* * * * *